(12) United States Patent
Charlier et al.

(10) Patent No.: US 8,177,472 B2
(45) Date of Patent: May 15, 2012

(54) PROCESS TO INVERT A STRUCTURE AND THE ASSOCIATED TOOLING TO SUCH A PROCESS

(75) Inventors: Dominique Charlier, Bourg de Thizy (FR); Henri Laurent, Mably (FR); Stephane Viganne, Renaison (FR)

(73) Assignee: Nexter Systems, Roanne (FR)

( * ) Notice: Subject to any disclaimer, the term of this patent is extended or adjusted under 35 U.S.C. 154(b) by 463 days.

(21) Appl. No.: 12/382,404

(22) Filed: Mar. 16, 2009

(65) Prior Publication Data
US 2009/0255108 A1 Oct. 15, 2009

(30) Foreign Application Priority Data

Apr. 14, 2008 (FR) ...................................... 08 02056

(51) Int. Cl.
*H01F 41/00* (2006.01)
*B66F 11/00* (2006.01)
*B65G 7/08* (2006.01)
*B65G 7/00* (2006.01)

(52) U.S. Cl. .......................... 414/782; 414/778; 414/816

(58) Field of Classification Search .................. 414/399, 414/754, 756, 758, 768–770, 773, 777–779, 414/782, 919; 52/116
See application file for complete search history.

(56) References Cited

U.S. PATENT DOCUMENTS

| 3,239,265 | A | * | 3/1966 | Scibilia | 294/67.4 |
| 3,284,888 | A | * | 11/1966 | McClain et al. | 29/407.01 |
| 3,620,395 | A | * | 11/1971 | Farmer, Sr. | 414/816 |
| 4,127,199 | A | * | 11/1978 | Clethero | 414/12 |
| 4,134,501 | A |   | 1/1979 | Tune |  |
| 4,173,428 | A | * | 11/1979 | Thornberg | 414/766 |
| 6,273,667 | B2 | * | 8/2001 | Karpisek | 414/425 |
| 6,419,983 | B1 | * | 7/2002 | Kreuzer | 427/242 |
| 2002/0069531 | A1 |   | 6/2002 | Walker et al. |  |

FOREIGN PATENT DOCUMENTS

| EP | 0 245 666 A2 | 11/1987 |
| GB | 1101089 | 1/1968 |
| JP | 58183326 A * | 10/1983 |

* cited by examiner

*Primary Examiner* — Gregory Adams
(74) *Attorney, Agent, or Firm* — Oliff & Berridge, PLC

(57) ABSTRACT

A process to invert a structure, for example a vehicle body after an equipment mounting phase, namely of mobility means, on the underside of said structure, process wherein the structure is made to swivel around an instantaneous axis of rotation which is perpendicular to the longitudinal axis of the structure, such axis of rotation being located in the vicinity of a first end of the structure, maneuvering means being positioned at the other end of the structure to control this swiveling.

10 Claims, 4 Drawing Sheets

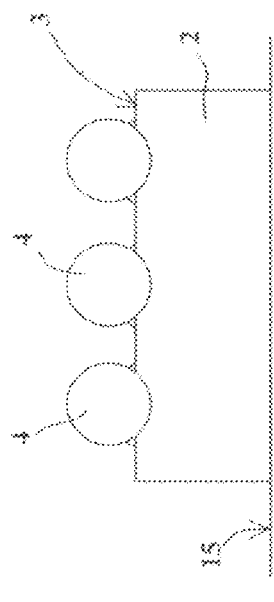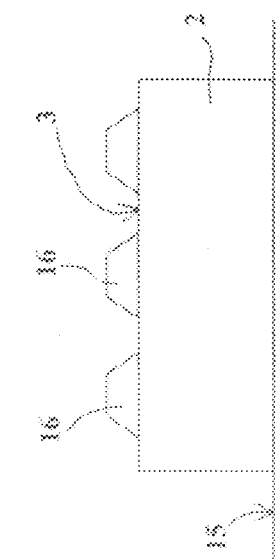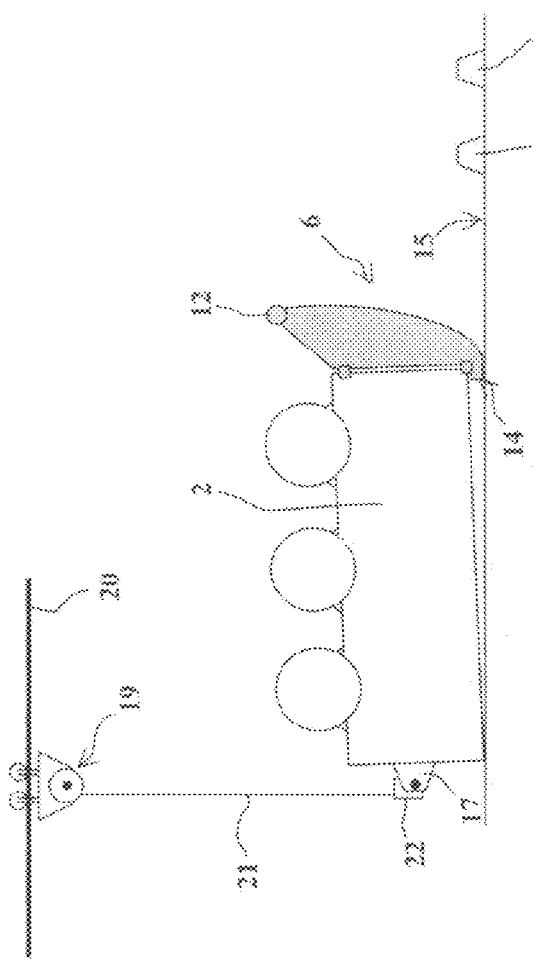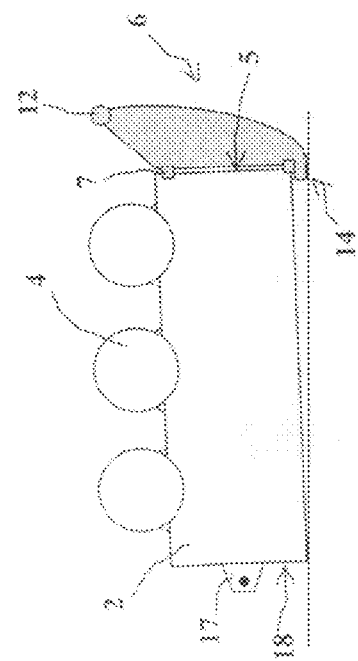

PROCESS TO INVERT A STRUCTURE AND THE ASSOCIATED TOOLING TO SUCH A PROCESS

BACKGROUND OF THE INVENTION

1. Field of the Invention

The technical scope of the invention is that of processes enabling the inversion of a structure and in particular that of a vehicle body.

2. Description of the related art

It is known to invert all or part of a vehicle, for example, to enable equipment to be more easily mounted on the underside of the vehicle. The vehicle's mobility means, such as wheels, axles or tracks, may thereby be mounted.

U.S. Pat. No. 6,615,478 thus discloses an assembly process for a heavy vehicle (such as a truck), process in which specific tooling enables the chassis to be made to swivel so as to make its underside accessible. This tooling comprises jaws integral with a frame which is mounted able to swivel around a horizontal shaft. The shaft of this frame is parallel to the longitudinal axis of the vehicle (or its chassis).

This process and tooling are well adapted to the inversion of relatively light chassis (with of mass of less than 1,000 kg). They are, however, not well adapted to the inversion of a structure such as a vehicle or the chassis of a very heavy vehicle (mass of over 5 tons), as would be the case, for example, of an armored vehicle.

Indeed, tooling such as that described by U.S. Pat. No. 6,615,478 sized so as to be able to invert such a mass cannot be envisaged because of the substantial overhang and the resulting mechanical stresses.

It is necessary, however, to enable the simple mounting of equipment to the underside of the vehicle and it is therefore necessary for means to be provided to ensure the inversion of the vehicle after such mounting.

The sole solution envisaged to date is that of the implementation of heavy handling means adapted to the mass to be inverted, for example boom trucks.

However, such means are costly, cumbersome and time-consuming to implement. They require the installation of complex sling means and there is a high risk of falls or mishandling.

SUMMARY OF THE INVENTION

The aim of the invention is to propose a process to invert a structure such as a vehicle, as well as the associated tooling, such process being inexpensive and simple to implement, quick and reliable.

The invention thus relates to a process to invert a structure, for example a vehicle body after an equipment mounting phase, namely of mobility means, on the underside of said structure, process wherein the structure is made to swivel around an instantaneous axis of rotation which is perpendicular to the longitudinal axis of the structure, such axis of rotation being located in the vicinity of a first end of the structure, maneuvering means being positioned at the other end of the structure to control this swiveling.

The maneuvering means may be constituted by at least one sling driven by a hoist.

According to one embodiment of the invention, a rocker is attached to the first end of the structure, such rocker incorporating a profile intended to come into contact with the ground to form a rolling surface.

The invention also relates to tooling to invert a structure, tooling enabling this process to be implemented.

This tooling is characterized in that it comprises a rocker that is attached at a first end of the structure, such rocker incorporating a profile intended to come into contact with the ground to form a rolling surface.

Advantageously, the rocker may incorporate at least one bar at one of its ends, such bar being intended to come into contact with the ground when the underside of the structure is substantially vertical, and which is intended to cooperate with at least one limit stop fixed to the ground to cause the structure to tip over.

The inversion tooling will also comprise, in a preferred mode, at least two limit stops fixed to the ground and delimiting the zone in which the bar will be positioned when the underside of the structure is substantially vertical.

Advantageously, the rocker will be of such dimensions that the mobility means of the structure will only come into contact with the ground when this structure has its underside close to horizontal.

BRIEF DESCRIPTION OF THE DRAWINGS

The invention will become more apparent from the follow description of a particular embodiment, such description made with reference to the appended drawings in which.

DETAILED DESCRIPTION OF PREFERRED EMBODIMENTS

Figure 1:
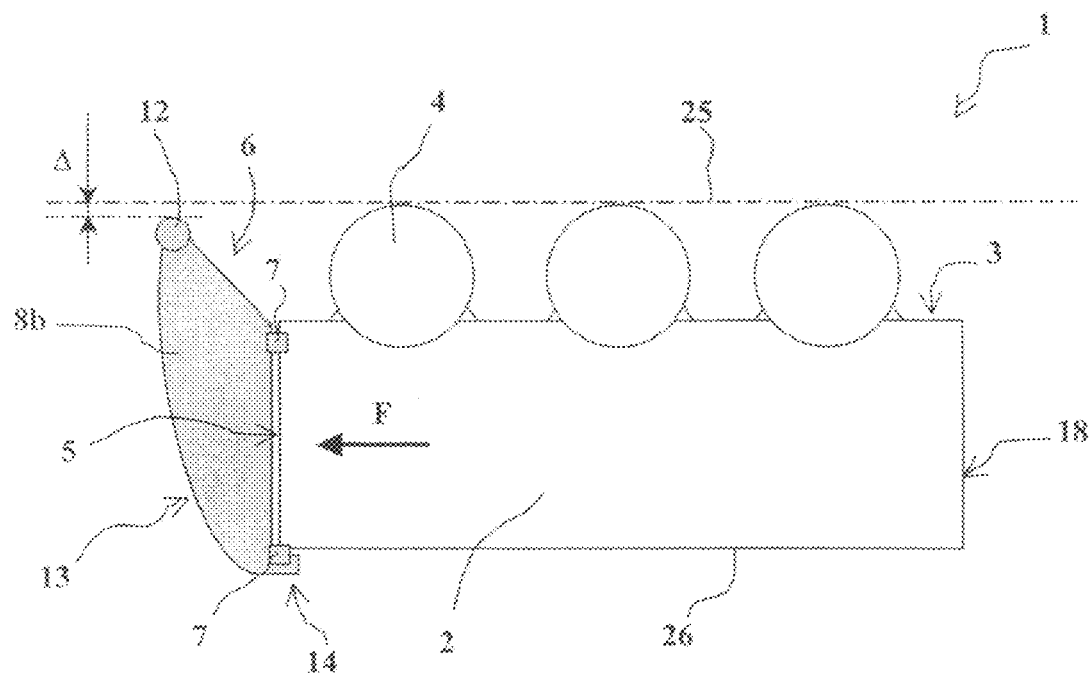
FIG. 1 schematically shows a vehicle carrying a rocker at one of its ends enabling the inversion to be controlled.

FIG. 1 schematically shows a vehicle 1 that is a wheeled armored vehicle. This vehicle 1 comprises a body 2 that has at its underside 3 three pairs of wheels 4 carried by axles (not visible in the Figure). A lot of other equipment is attached to this underside 3: mechanical transmissions, axles, running gear, suspensions. This equipment is not shown here since it does not form the subject of the invention and its representation would cast no further light on the invention itself.

To facilitate the mounting of all this equipment, which can be relatively heavy, the body 2 is positioned upside down on the ground, thereby facilitating the positioning and attachment of the equipment to the underside 3.

Once this equipment has been attached, it will be necessary for the vehicle body to be turned back over and positioned with its wheels on the ground.

In accordance with the invention, inversion tooling comprising a rocker 6 will be attached to a first end 5 of the vehicle 1 (for example, the rear end).

This rocker is attached to the vehicle 1 by appropriate joining means 7, for example lugs welded to the rocker 6 and incorporating bolts able to cooperate with matching lugs integral with the end 5 of the vehicle 1.

Figure 2:
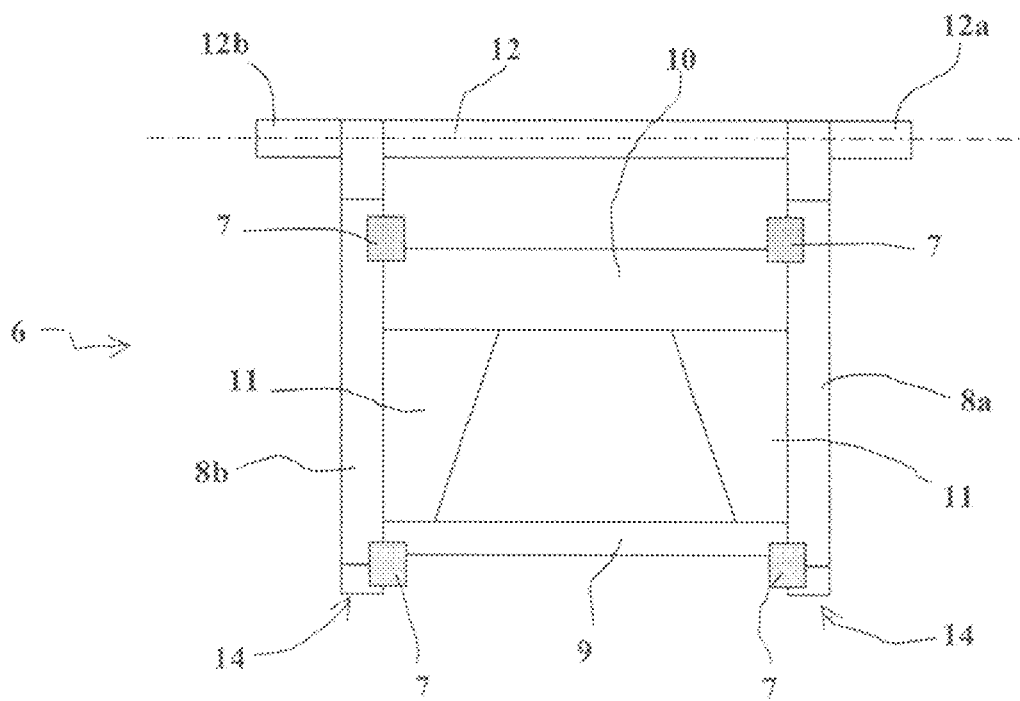
FIG. 2 is a view of the rocker alone following the direction of observation referenced F in FIG. 1, FIGS. 3a to 3h are eight Figures schematizing the different steps of the inversion process according to the invention.

FIG. 2 shows the rocker 6 following direction F (FIG. 1). This rocker is a mechanical-welded structure that incorporates two lateral flanges 8a, 8b, which are linked to one another by struts 9 and 10. Sheet metal stiffeners 11 are also welded between the struts 9 and 10 and the flanges 8a, 8b.

Furthermore, the rocker 6 incorporates a cylindrical bar 12 at one of its ends. This bar 12 has ends 12a and 12b which protrude on either side of each flange 8a, 8b.

We observe in FIG. 1 that the flanges 8a, 8b of the rocker 6 incorporate a convex external profile 13 that is intended to come into contact with the ground and which forms a rolling surface for the flange with respect to the ground. This convex profile extends from the bar 12 to the other end of the flange 8a, 8b. This other end of each flange incorporates a nib 14 on which a fastening lug 7 is positioned.

This nib 14 helps to form a bearing surface to protect the edge of the vehicle body 2. This nib 14 comes into contact with the ground at the onset of the inversion movement and avoids the body being damaged during this phase.

The process according to the invention will now be described with reference to FIGS. 3a to 3h.

In FIG. 3a, the vehicle body 2 is shown position upside down on the ground 15. This body is unequipped and its underside 3 here is fitted with machined mounts 16 intended to receive the axles.

FIG. 3b shows the same body 2 on which the axles and wheels 4 have been put into position (as well as other equipment not shown here).

FIG. 3c shows the body 2 to which the rocker 6 has been attached (at a first end 5). Attachment means 17 are also shown in this Figure that are integral with the other end 18 of the vehicle body. These attachment means are schematized here in the form of a clevis. According to the geometry of the vehicle, it may be constituted by attachment lugs integral with the body 2 and onto which a tow sling may be positioned. It may also be constituted by specific tooling (for example, an attachment bar) that will be fastened to the vehicle by appropriate attachment lugs.

We note that in FIG. 3c, the vehicle body 2 is slightly inclined, the nibs 14 of the rocker 6 pressing on the ground. Before attaching the rocker 6, the body 2 is slightly raised by lifting means such as a hoist.

FIG. 3d shows this same body 2 at the onset of the inversion phase.

A hoist (or bridge crane) 19 is positioned above the vehicle body 2. The power of the hoist will naturally be adequate for the mass of the vehicle to be turned upside down. This hoist is mounted able to roll on rails 20 attached to the workshop ceiling. It controls the winding of a sling 21 ending in a hook 22 that is fastened to the attachment means 17. This sling 21 driven by the hoist 19 constitutes maneuvering means for the body 2.

Figure 3E:
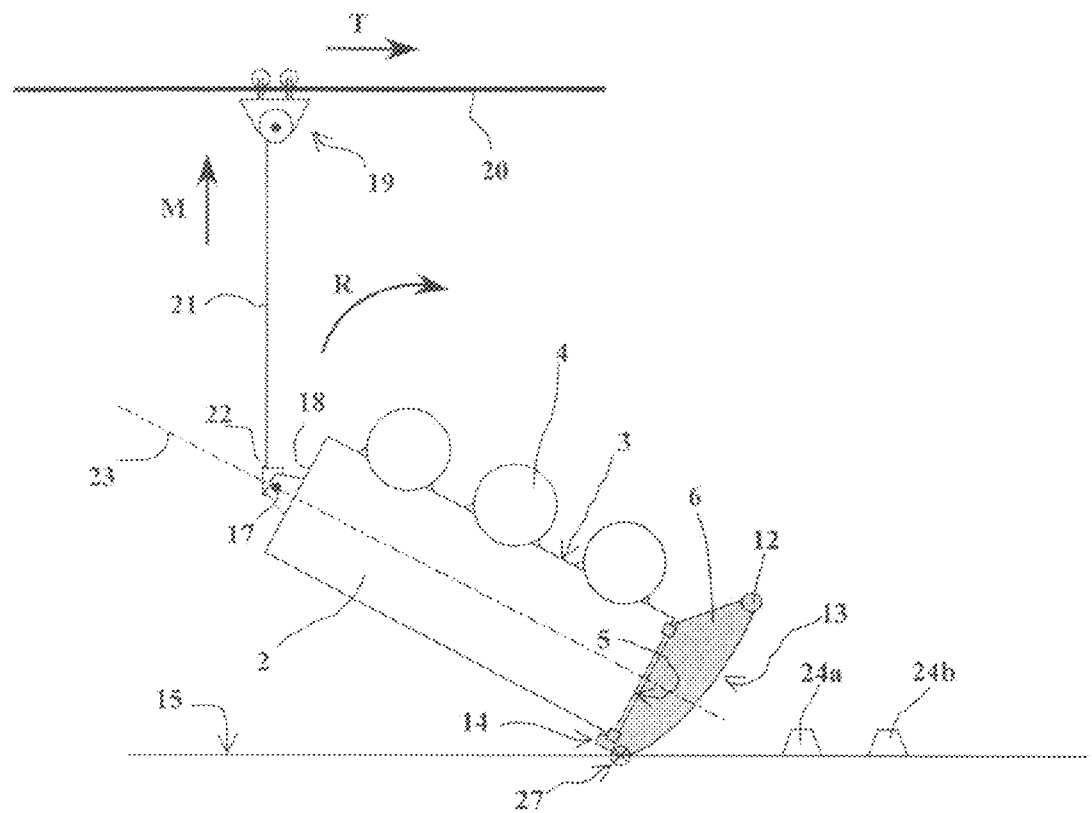

FIG. 3e shows the onset of the inversion phase. The hoist 19 moves (arrow T) whilst raising the sling 21 (arrow M). The vehicle body 2 pivots (arrow R), the rocker 6 being able to roll on the ground 15 thanks to its profile 13 which constitutes a rolling surface. We note that the body 2 does not come into direct contact with the ground since the rocker 6 protects it. It is therefore in no way damaged during the maneuver, despite its considerable mass.

The vehicle body pivots around an instantaneous axis of rotation 27 that is perpendicular to a longitudinal axis 23 of the vehicle. The axis of rotation 27 does not have a fixed position during the inversion movement. It corresponds at any one time to a virtual line of contact between the rocker 6 and the ground 15. It is however always located at the ground 15 in the vicinity of the first end 5 of the vehicle, whereas the maneuvering means 21, 22, 19 are fixed at the other end 18 of the vehicle.

The vehicle body 2 thus rolls on the profile 13 of the rocker. We note that limit stops 24a and 24b have been positioned on the ground 15. In practical terms, there are two forward limit stops 24b each arranged to come into contact with a different end 12a, 12b of the bar 12. There are also two rearward limit stops 24a, which are symmetrical to the former with respect to a vertical plane. Thus, during the movement of the body, the limit stops are found to be on either side of the flanges 8a, 8b of the rocker 6 which therefore does not touch the limit stops.

These limit stops 24a, 24b are positioned such that at the end of the rolling motion of the rocker 6, the bar 12 integral with the rocker is positioned between the limit stops.

Figure 3F:
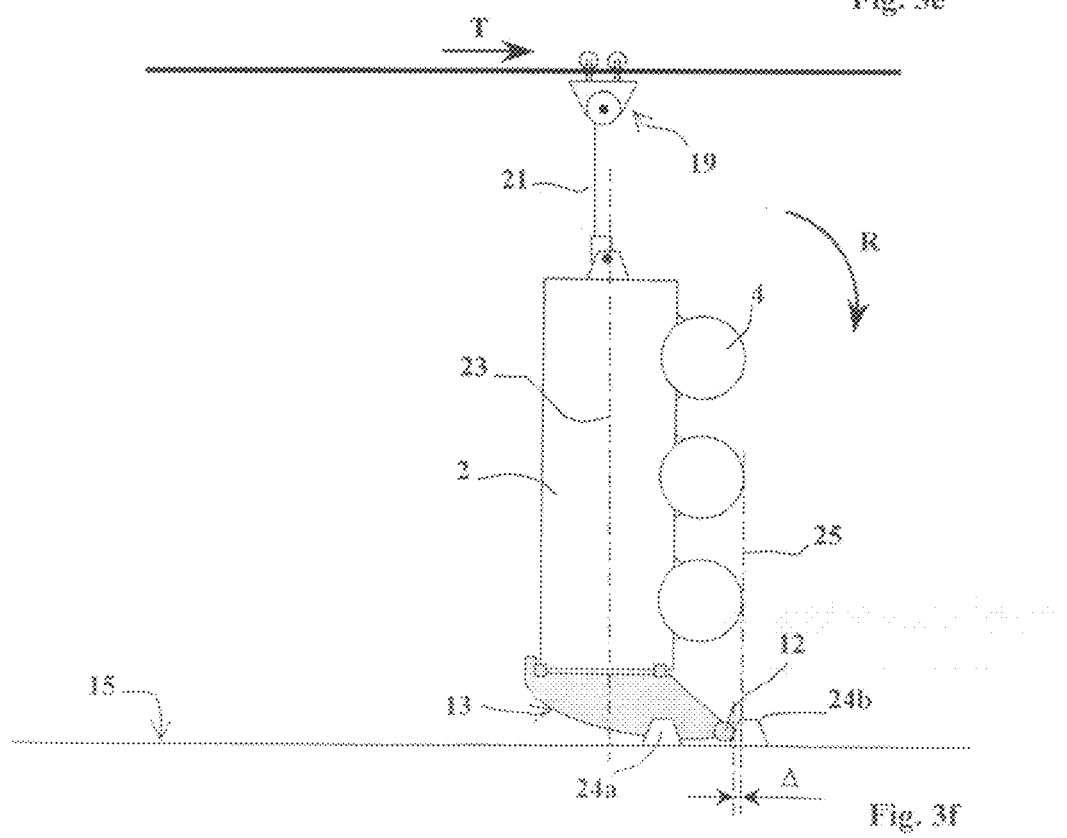

FIG. 3f shows the positions of the body 2 when the latter's longitudinal axis 23 is practically vertical. The hoist 19 thus slightly raises the body 2, which for a time is no longer in contact with the ground (it being raised by approximately 1 centimeter). The sling 21 is thus at its minimal length and the hoist 19 continues its translation movement (arrow T), the body remaining in its suspended balanced position, with its centre of gravity directly above the attachment means (or hooking point) 17.

The limit stops 24a and 24b enable the location of the bar 12 to be controlled. They delimit the zone in which the bar will be positioned to secure the inversion operation.

The bar 12 is no longer in contact with the ground by further to the translation T of the hoist 19, its ends 12a, 12b come into contact with the forward limit stops 24b. This results in the body 2 starting to tip over following arrow R. The body's centre of gravity passes to the other side of the vertical plane where it was located as the body was being raised, and the body 2, stopped by the forward limit stops 24b, will naturally tend to continue to swivel in the direction of arrow R, such swiveling being controlled using the hoist 19.

Figure 3G:
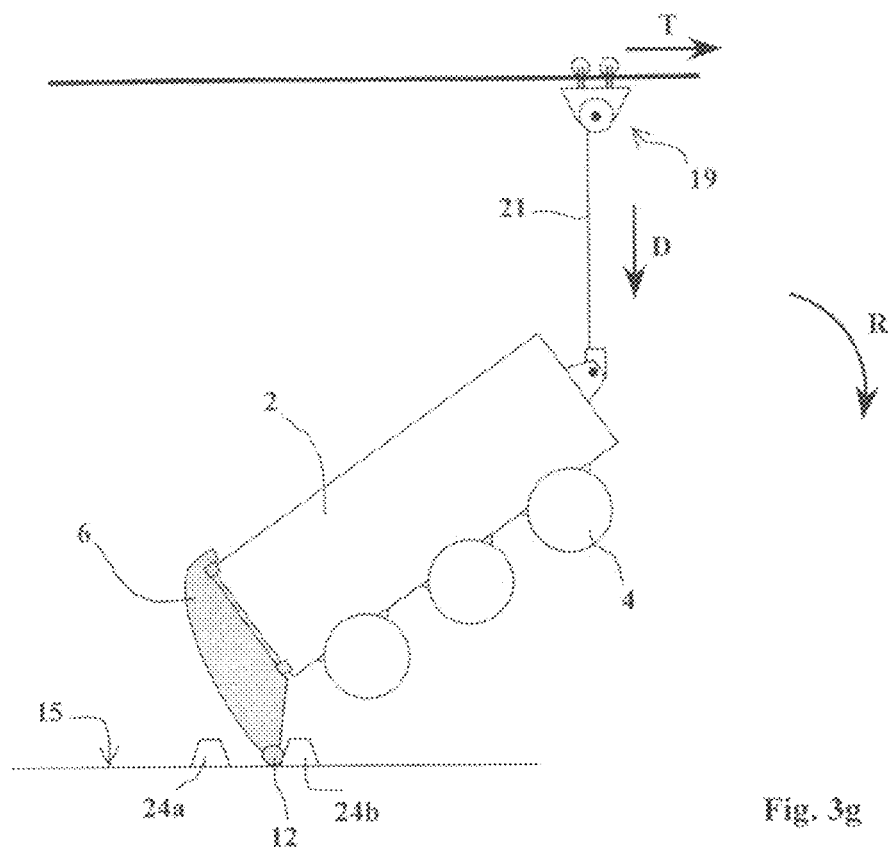

FIG. 3g thus shows the continuance of the inversion movement of the vehicle body. The hoist 19 continues its translation (arrow T) whereas the sling 21 is extended (arrow D). The vehicle body 2 continues to swivel (arrow R) in a clockwise direction. The bar 12 presses against the forward limit stops 24b.

Figure 3H:
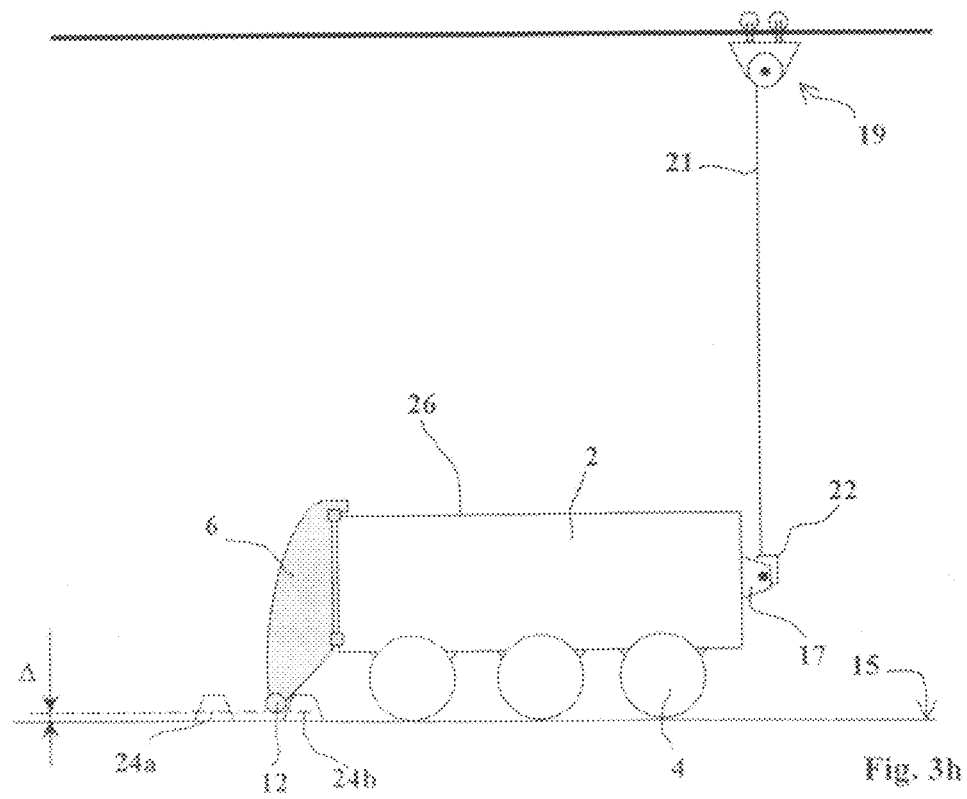

FIG. 3h shows the final phase in the inversion. The body 2 is positioned on the ground 15 on its wheels 4.

We note that in FIGS. 3f and 3h, the rocker 6 is dimensioned such that the bar 12 is offset by a distance Δ with respect to the plane 25, which is the centre line of the wheels 4. This offset is such that when the wheels 4 come into contact with the ground (FIG. 3h) the bar 12 is not touching the ground. This distance Δ is of around ten centimeters. It enables the moment at which the wheels 4 will effectively come into contact with the ground to be controlled.

Thus, the mobility means (wheels 4) never constitute a swivel axis for the body 2 during the inversion maneuver. The mechanical stresses to which the axle is subjected are therefore limited. It is the rocker 6 alone which is subjected to all the loads and stresses linked to the inversion movement.

After this last phase (FIG. 3h), the sling 21 merely needs to be detached and the rocker 6 and optionally the attachment means 17 dismounted.

Assembly of the vehicle 1 may now continue with the equipment fixed to the topside 26 of the body as well as any interior equipment.

The invention may be adapted to the inversion of any type of vehicle or heavy structure, mobile or not.

For this, the rocker 6 and attachment means 17 merely have to be adapted to the shape of the structure in question. The invention may namely be implemented in the inversion of tracked armored vehicles.

What is claimed is:

1. A process to invert a structure having a longitudinal axis, a first end, a second end, a topside and an underside, the process enabling mounting of mobility means on the underside of the structure when the structure is in a form of a vehicle body, the process comprising:

attaching a rocker to the first end of the structure when the topside of the structure is facing a ground, the rocker contacting the ground;

attaching a sling driven by a hoist to the second end of the structure; and rotating the structure about an instantaneous axis of rotation extending perpendicular to the longitudinal axis and being located on the rocker, by lifting the second end of the structure with the sling driven by the hoist, wherein the rocker comprises:
- a fastener that permits attachment of the rocker to the first end;
- a nib that, when the rocker is attached to the first side, extends under the topside and contacts the ground;
- a bar that, when the rocker is attached to the first end, extends perpendicular to the longitudinal axis; and
- a convex profile that extends from the nib to the bar.

2. The process according to claim 1, further comprising:

after the structure has been rotated so that the underside is substantially vertical:
- causing the bar to contact a forward limit stop; and
- causing the structure to rotate about the bar by lowering the second side of the structure with the hoist.

3. The process according to claim 2, wherein:

the rocker further comprises flanges, the flanges include the convex profile contacting the ground;

the bar is attached to the flanges, the bar comprises bar ends, each bar end extends beyond a respective one of the flanges; and the process further comprising:
- causing at least one of the bar ends to contact the forward limit stop.

4. The process according to claim 1, wherein:

the hoist is mounted on a rail; and the process further comprising:
- causing the structure to rotate about the instantaneous axis of rotation by moving the hoist along the rail.

5. The process according to claim 1, further comprising:

causing the bar to contact the ground between a forward limit stop and a rearward limit stop, the forward limit stop and the rearward limit stop each being attached to the ground.

6. A system for inverting a structure having a longitudinal axis, a first end, a second end, a topside and an underside, the system enabling mounting of mobility means on the underside of the structure when the structure is in a form of a vehicle body, the system comprising:

- a rocker attached to the first end of the structure and contacting a ground when the topside of the structure is facing the ground; and
- a sling attached to the second end of the structure, the sling being driven by a hoist, wherein
- the rocker incorporates a profile intended to come into contact with the ground, enabling the structure to rotate about an instantaneous axis of rotation extending perpendicular to the longitudinal axis when lifting the second end of the structure with the sling driven by the hoist; and the rocker comprises:
- a fastener that permits attachment of the rocker to the first end;
- a nib that, when the rocker is attached to the first side, extends under the topside and contacts the ground;
- a bar that, when the rocker is attached to the first end, extends perpendicular to the longitudinal axis; and
- a convex profile that extends from the nib to the bar.

7. The system according to claim 6, further comprising:

at least two limit stops fixed to the ground and delimiting a zone in which the bar will be positioned when the underside of the structure is substantially vertical.

8. The system according to claim 6, wherein, when the mobility means is mounted on the underside of the structure, the rocker is dimensioned such that, during inversion, the mobility means only comes into, contact with the ground when the underside is facing the ground and close to horizontal.

9. The system according to claim 6, wherein:

when the mobility means is mounted on the underside of the structure, an outermost extent of the mobility means from the underside is defined by a plane; and the rocker is dimensioned such that, when the rocker is attached to the structure, an outermost extent of the bar is at a predetermined distance from the plane.

10. The system according to claim 6, wherein:

the rocker further comprises flanges, the flanges include at least a part of the convex profile; and the bar is attached to the flanges, the bar comprises ends, each end extends beyond the flanges.

* * * * *